United States Patent
Barrass et al.

(10) Patent No.: US 10,333,437 B2
(45) Date of Patent: *Jun. 25, 2019

(54) MOTOR CONTROL APPARATUS AND METHOD

(71) Applicant: Sevcon Limited, Gateshead (GB)

(72) Inventors: Peter Barrass, Gateshead (GB); David Hodgson, Gateshead (GB); Howard Slater, Gateshead (GB)

(73) Assignee: Sevcon Limited, Gateshead (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/702,096

(22) Filed: Sep. 12, 2017

(65) Prior Publication Data

US 2018/0006587 A1    Jan. 4, 2018

Related U.S. Application Data

(63) Continuation of application No. 14/769,901, filed as application No. PCT/GB2014/050537 on Feb. 21, 2014, now Pat. No. 9,793,834.

(30) Foreign Application Priority Data

Feb. 25, 2013 (GB) .................................. 1303280.0

(51) Int. Cl.
*H02P 6/08* (2016.01)
*H02P 6/06* (2006.01)
(Continued)

(52) U.S. Cl.
CPC ................ *H02P 6/08* (2013.01); *H02P 6/007* (2013.01); *H02P 6/06* (2013.01); *H02P 6/28* (2016.02);
(Continued)

(58) Field of Classification Search
CPC .. H02P 27/06; H02P 27/08; H02P 6/08; H02P 6/10; H02P 6/28; H02P 6/06;
(Continued)

(56) References Cited

U.S. PATENT DOCUMENTS 5,736,825 A * 4/1998 Kaura .................... G05B 11/28
318/599
7,592,765 B2   9/2009 Rahman
(Continued)

FOREIGN PATENT DOCUMENTS

CN   101396976   4/2009
JP   2001-095106  4/2001
(Continued)

OTHER PUBLICATIONS

Kennel, Ralph, "Power Electronics Exercise: Pulse Width Modulation Methods 2013," Oct. 10, 2013, [retrieved on Jan. 15, 2018]. Retrieved from the Internet: URL: <https://www.eal.ei.tum.de/fileadmin/tueieal/www/courses/PE/tutorial/2013-2014-W/07_PWM.pdf>.

*Primary Examiner* — Thai T Dinh
(74) *Attorney, Agent, or Firm* — Woodard Emhardt Henry Reeves & Wagner, LLP (57) ABSTRACT

An apparatus for controlling an AC power supply for an electric motor, said AC power supply being derived from a DC voltage. The apparatus including a comparer configured to provide a comparison of a modulation index of a motor control signal with a reference value. This current data provider is configured to provide current data based on a torque demand signal; a speed signal indicating the speed of rotation of the AC motor; and an indication of the DC voltage modified on the comparison for control of the motor control signal which is based on the motor current data.

24 Claims, 3 Drawing Sheets

(51) Int. Cl.
*H02P 21/00* (2016.01)
*H02P 27/06* (2006.01)
*H02P 6/28* (2016.01)
*H02P 25/024* (2016.01)
*H02P 6/00* (2016.01)

(52) U.S. Cl.
CPC ........ *H02P 21/0089* (2013.01); *H02P 25/024* (2016.02); *H02P 27/06* (2013.01); *H02P 2207/05* (2013.01)

(58) Field of Classification Search
CPC ........ H02P 6/002; H02P 21/00; H02P 25/098; H02P 27/12
USPC .... 318/400.15, 400.02, 400.06, 400.26, 722, 318/432, 461
See application file for complete search history.

(56) References Cited

U.S. PATENT DOCUMENTS

| | | | |
|---|---|---|---|
| 7,595,600 B2* | 9/2009 | Patel | H02P 21/141 318/400.32 |
| 7,622,877 B2* | 11/2009 | Schulz | H02P 21/0089 318/430 |
| 8,004,220 B2 | 8/2011 | Sparey | |
| 8,779,702 B2* | 7/2014 | Si | H02P 21/0089 318/400.02 |
| 2005/0035676 A1 | 2/2005 | Rahman et al. | |
| 2005/0168186 A1* | 8/2005 | Matsubara | H02P 21/22 318/575 |
| 2006/0066275 A1* | 3/2006 | Thunes | H02P 21/10 318/432 |
| 2008/0265808 A1 | 10/2008 | Sparey | |
| 2012/0306423 A1* | 12/2012 | Si | H02P 21/0089 318/493 |

FOREIGN PATENT DOCUMENTS

| | | |
|---|---|---|
| JP | 2005-210874 A | 8/2005 |
| JP | 2006-014540 | 1/2006 |
| JP | 2006-204050 | 8/2006 |
| JP | 2007-228744 | 9/2007 |
| JP | 2009278760 | 11/2009 |
| JP | 2012-075236 | 4/2012 |

\* cited by examiner

MOTOR CONTROL APPARATUS AND METHOD

CROSS REFERENCE TO RELATED APPLICATIONS

This application is a continuation of U.S. application Ser. No. 14/769,901 filed Aug. 24, 2015, which is the U.S. national stage of International Patent Application No. PCT/US2014/050537 filed Feb. 21, 2014, which claims the benefit of Great Britain Patent Application No. 1303280.0 filed Feb. 21, 2013, all of which are hereby incorporated by reference in their entirety.

BACKGROUND

The present disclosure relates to apparatus and methods for the control of electric motors, and more particularly for methods and apparatus for the control of permanent magnet motors, still more particularly to field weakening strategies for permanent magnet AC motors.

Permanent magnet motors offer a number of advantages, and their use in various applications is increasing. In the control of permanent magnet motors field weakening phenomena may be exploited to control motor performance. In particular, field weakening schemes enable the operating limits of permanent magnet motors to be expanded by modifying the current vector control in view of the modulation index.

DETAILED DESCRIPTION

Embodiments of the disclosure will now be described, by way of example only, with reference to the accompanying drawings, and particular examples and features of the disclosure are set out in the appended claims.

Figure 1:
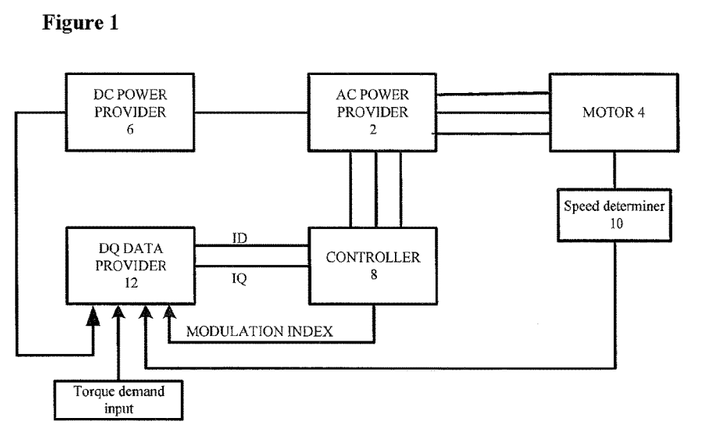
FIG. 1 shows a schematic view of an apparatus comprising an electric motor.

In overview, the apparatus of FIG. 1 is arranged to control a salient or non-salient pole permanent magnet AC, PMAC, motor 4, based on torque demand, and the torque-speed characteristics of the motor 4.

As will be appreciated by the skilled addressee in the context of the present disclosure, the current in the windings of such a motor may be considered in a reference frame which rotates with the rotor of the motor. In this reference frame, the current in the motor windings has a direct phase component, in phase with the rotor, and a quadrature phase component $\pi/4$ out of phase with the rotor. These current components are referred to as D and Q currents respectively, $I_D$, $I_Q$.

The inventors in the present case have appreciated that pole PMAC motors cannot be controlled using a traditional strategy of holding the direct phase current, $I_D$, at zero and applying quadrature phase current, $I_Q$, in proportion to the torque demand because both current phases, $I_D$ and $I_Q$ produce torque. To address this $I_D$ and $I_Q$ data may be indexed by motor speed and torque demand to enable the motor to be controlled to produce a required torque according to its characteristics at a given speed. In addition, for field weakening, the example of FIG. 1 also indexes the $I_D$ and $I_Q$ data based on DC link voltage.

In an embodiment, to control the modulation index the voltage used to index the $I_D$ and $I_Q$ data is reduced in proportion to the amount by which the modulation index exceeds a threshold. Typically the $I_D$ and $I_Q$ data are defined for a limited range of DC link voltages, and for a limited range of speeds and torque demands.

Once the modulation index adjustment of the DC link voltage has reached the limit of the defined voltage range, a first additional stage of field weakening adjustment may be applied to reduce the torque demand used to index the $I_D$ and $I_Q$ data.

Once the limit of this first additional adjustment stage has been reached (e.g. the minimum torque demand for which $I_D$ and $I_Q$ data values are defined), the $I_D$ current itself may be reduced in a second additional stage of field weakening.

FIG. 1 illustrates one system for putting this disclosure into effect.

In FIG. 1 an AC power provider 2 is coupled to an AC motor 4, and a DC power provider 6. The AC power provider is also coupled to a controller 8. The controller 8 is also coupled to a DQ data provider 12. A speed determiner 10 is coupled to the motor 4 and to the DQ data provider 12.

The DC power provider 6 is operable to provide a DC voltage to the AC power provider 2. The DC power 6 provider may also be coupled to provide power for other elements of the apparatus of FIG. 1, but in the interests of clarity the individual power couplings are not shown in the diagram.

The AC power provider 2 is operable to derive a multi-phase AC power supply for the motor 4 from the DC voltage, and to control the timing and power of the AC power supply based on a motor control signal received from the controller 8.

The motor 4 comprises a pole permanent magnet AC motor (in this example a salient pole permanent magnet AC motor), arranged to receive the multi-phase AC power supply from the AC power provider. The motor 4 comprises windings arranged to provide a rotating magnetic field in response to the multi-phase AC power supply.

The controller 8 is configured to receive an indication of required direct phase, and quadrature phase currents and to provide to the AC power provider 2 a control signal for controlling the AC power provider 2 to provide a three phase AC power supply for the AC motor 4. The modulation index of this control signal may be defined by the ratio of the control signal's amplitude to the available dynamic range of the controller 8, e.g. the control signal amplitude divided by the maximum available control signal voltage. In a pulse width modulation, PWM, controller the modulation index may be defined by the ratio of the control signal amplitude to the timing or clock signal used to derive the PWM output signal.

The speed determiner 10 is arranged to determine the speed of rotation of the motor 4 and to provide a speed signal to the DQ data provider 12.

The DQ data provider 12 is configured to receive a torque demand input, a speed signal from the speed determiner 10, and an indication of the DC voltage from the DC power provider 6. The DQ data provider is also configured to receive an indication of the modulation index of the motor control signal provided by the controller 8 to the AC power provider 2. The DQ data provider is further configured to select direct phase and quadrature phase current values selected for the motor 4 based on the modulation index, the DC voltage, the motor speed and the torque demand and to provide to these current commands to the controller 8 based on the selected values. The DQ data provider is configured to perform this selection according to characteristics of the motor 4 defined in a stored look-up table relating the speed, torque demand and voltage to direct phase and quadrature phase current values.

In operation, the speed determiner determines the speed of the motor 4 and passes a speed signal to the DQ data provider 12. The DQ data provider 6 also receives a torque demand signal, an indication of the link DC voltage of the AC power provider 2, and the modulation index of the control signal provided by the controller 8 to the AC power provider 2.

Based on the received signals the DQ data provider 6 selects phase current $I_D$, and quadrature phase current $I_Q$ commands. The selected $I_Q$ and $I_D$ commands are provided to the controller 8 which generates a PWM control signal for controlling the AC power provider 2. The AC power provider 2 provides a multi-phase AC power supply to the motor 4 in accordance with the selected $I_D$, $I_Q$ data.

The operation of the DQ data provider 12 will be described in greater detail with reference to FIGS. 2, 3 and 4 below. However, in summary, the DQ data provider 12 is configured to apply a three stage field weakening scheme. In the first stage, the received modulation index is compared with a threshold, and the DC voltage used to select the $I_D$-$I_Q$ data is reduced according to the amount by which the modulation index exceeds that threshold. This reduces the modulation index by reducing the commanded $I_D$ and/or $I_Q$ current.

If the modulation index continues to increase, the DC voltage will ultimately be reduced to the minimum DC voltage for which the $I_D$-$I_Q$ data is defined. In that eventuality, the DQ data provider 12 of FIG. 1 is configured to apply an additional stage of field weakening adjustment by reducing the torque demand used to select the $I_D$ and $I_Q$ data, thereby in turn reducing the modulation index.

Nevertheless, if the modulation index continues to increase still further, the reduced torque demand may reach the minimum value for which $I_D$ and $I_Q$ commands are defined, and in that eventuality, the DQ data provider 12 of FIG. 1 is configured to reduce the $I_D$ current command provided to the controller 8.

One example of an apparatus to provide the functionality of the DQ data provider 12 of FIG. 1 is described with reference to FIG. 2.

Figure 2:
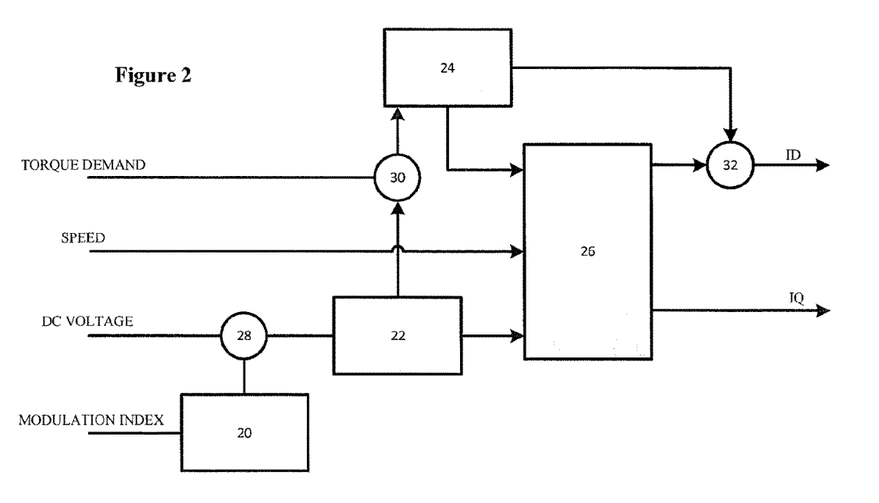
FIG. 2 shows a DQ data provider for use in the apparatus of FIG. 1.

The apparatus of FIG. 2 comprises a comparer 20 coupled to receive a modulation index signal and coupled to a first combiner 28. The first combiner 28 is coupled to receive an indication of the DC voltage, and to receive the output of the comparer 20. The output of the first combiner 28 is coupled to a torque demand modifier 22.

The torque demand modifier 22 is coupled to provide a first output to a current data provider 26, and a second output to a second combiner 30. The second combiner is also coupled to receive a torque demand signal, and to provide an output to a current data modifier 24. The current data modifier is coupled to provide a first output to the current data provider 26, and a second output to a third combiner 32. The current data provider 26 is coupled to provide a quadrature current output, $I_Q$, and to provide an in phase current output $I_D$ to the third combiner 32.

The current data provider 26 comprises a plurality of stored associations, each of which associates one of a plurality of current data elements with a respective: motor speed, torque demand, and DC voltage. Thus the current data provider 26 is operable to provide current data by selecting amongst stored data elements based on these associations. The associations define current data for a selected range of DC voltage values, a selected range of motor speed values, and a selected range of torque demand values. These ranges are referred to herein as "the voltage range", "the speed range", and "the torque range" respectively.

The comparer 20 is operable to compare the received modulation index with a reference, to determine the difference between the modulation index and this reference. This enables the comparer to produce an output based on this difference. The comparer 20 is configured to clip this output to ensure that it is not negative, and does not exceed a selected maximum output. The combiner 28 is arranged to subtract the clipped output of the comparer 20 from the DC voltage input. The output from the first combiner 28 is coupled to the torque demand modifier 22.

The torque demand modifier is configured to provide two outputs. The first output is the output from the first combiner 28 (e.g. modified DC voltage input) clipped to within the voltage range of the current data provider 26, e.g. DC voltage values less than the minimum value in the voltage range are mapped to that minimum, and DC voltage values which are greater than the maximum value in the voltage range are mapped to that maximum value. This first output is coupled to the current data provider 26 to enable the selection of current data based on this first output, e.g. the first output is the DC voltage input modified to take account of an excess in the modulation index, so that by reducing the DC voltage the modulation index can be controlled.

The second output from the torque demand modifier is based on the difference between the input and the first output, e.g. the clipped value is subtracted from the input value to provide the second output. Thus, in the event that the modified DC voltage lies outside the voltage range of the current data modifier 26, the second output from the torque demand modifier 22 is based on the difference between the boundary of the voltage range and the modified DC voltage. By contrast, in the event that the input to the torque demand modifier 22 is within the voltage range, the second output from the torque demand modifier is zero (because no clipping takes place). Thus, in this embodiment, the voltage adjustment is applied first, and only once the voltage adjustment has reached its limit is the torque demand adjusted.

The second output of the torque demand modifier 22 is combined with the torque demand signal by the combiner 30 to provide a modified torque demand. This modified torque demand is coupled to the current data modifier 24.

The current data modifier 24 is configured to provide two outputs. The first output from the current data modifier 24 is the modified torque demand, clipped to within the torque range of the current data provider 26. This output is coupled to the torque demand input of the current data provider 26. The second output from the current data modifier is based on the difference between the modified torque demand signal and the first output. Thus, in the event that the modified torque demand signal is within the torque range, the second output is zero, but in the event that the modified torque demand lies outside the torque range, the second output is based on the difference between a boundary of the torque range and the modified torque demand signal.

The second output from the current data modifier is coupled to the third combiner 32 which is arranged to combine the second output with the selected in phase current data provided by the current data provider 26. Accordingly, in the event that the modified torque demand is in the torque range, the in phase current data is not adjusted, but in the event that the torque demand is modified out of the torque range, the in phase current data, $I_D$ is modified to produce the current command. Thus, in this embodiment, the DC voltage adjustment is applied first, and once the DC voltage adjustment has reached its limit, the torque demand adjusted, and once the torque adjustment has reached its limit, the in-phase current data, $I_D$ adjusted.

The example of FIG. 2 has been set out assuming particular signal polarities. However, as will be appreciated in the context of the present disclosure, the actual signal polarities may be varied if, for example, signals are combined by being added rather than being subtracted or vice versa. The example of FIG. 2 illustrates certain functionality of the apparatus as functional elements or blocks. However, this is merely illustrative and equivalent functionality may be provided by different subdivisions of function. For example each illustrated functional unit may be further subdivided, or the functionality of two or more of the illustrated elements may be integrated. In some examples a single processor may provide some or all of the functionality illustrated in FIG. 2. Such a processor may be provided by a suitably programmed general purpose processor, or by an application specific integrated circuit, ASIC, or by a field programmable gate array, FPGA. Examples of the disclosure provide computer program products in the form of software and/or middleware, and/or firmware, comprising program instructions operable to program a processor to provide the apparatus of FIG. 2.

Figure 3:
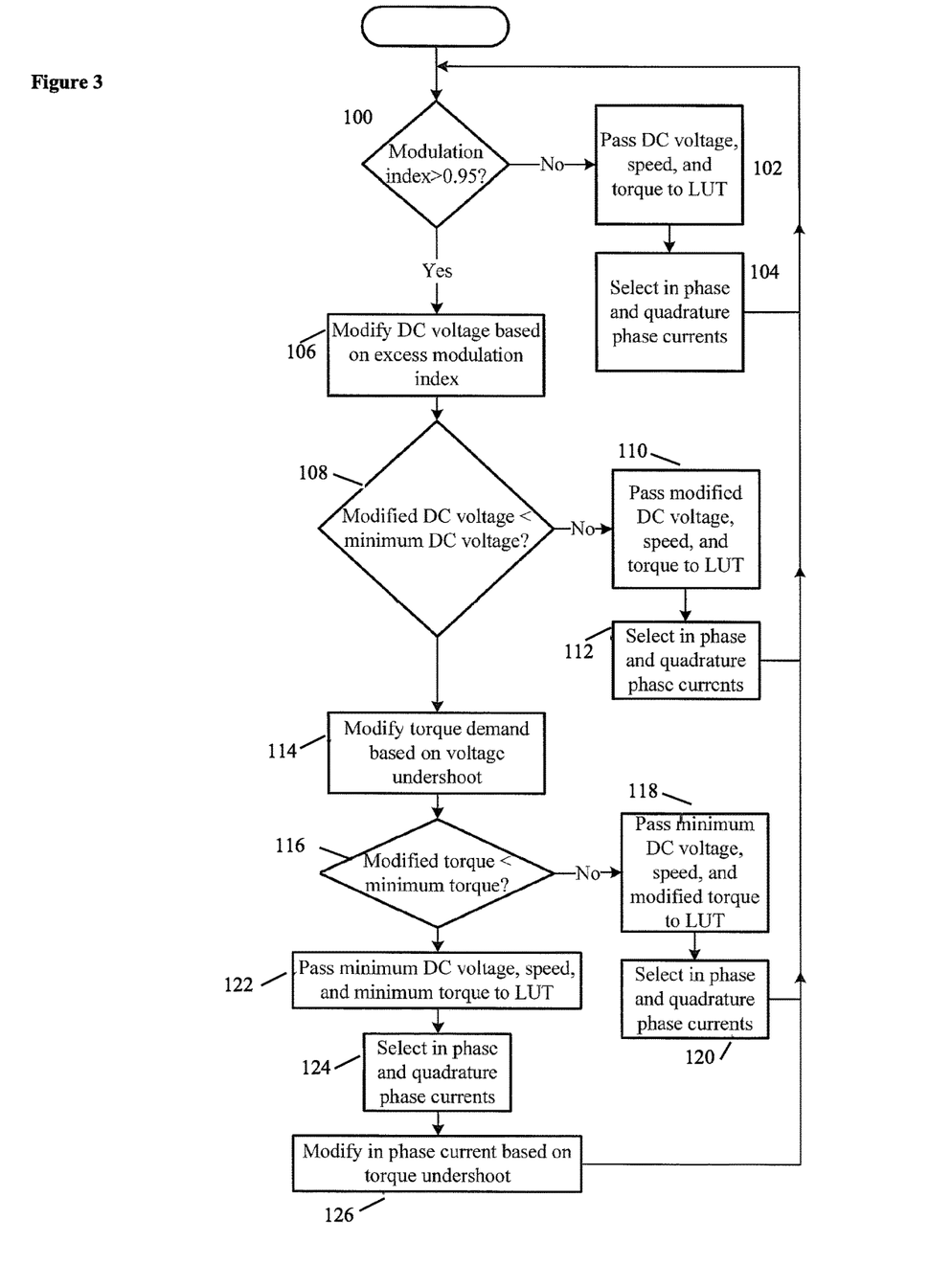
FIG. 3 shows a flow diagram indicating a method of controlling a motor.

FIG. 3 illustrates a method of controlling an electric motor based on the DC voltage, the motor speed, and the torque demand.

The modulation index of a motor control signal is compared 100 with a threshold. In the event that the modulation index is less than the threshold, the DC voltage, speed and torque values are passed 102 for use in a selection 104 of in phase and quadrature phase currents for the motor. In the event that the modulation index is greater than the threshold the DC voltage is modified 106 based on the overshoot of the modulation index.

The modified DC voltage is compared 108 with a minimum DC voltage, and in the event that the modified DC voltage is not less than the minimum, the modified DC voltage, speed and torque values are passed 110 for use in a selection 112 of in phase and quadrature phase currents for the motor. In the event that the DC voltage is less than the minimum DC voltage, the torque demand is modified 114 based on the DC voltage undershoot.

The modified torque is compared 116 with a minimum torque, and in the event that the modified torque is not less than the minimum torque, the minimum DC voltage, the modified torque, and the motor speed are passed 118 for use in a selection 120 of in phase and quadrature phase currents for the motor. In the event that the modified torque is less than the minimum torque, the minimum DC voltage, the minimum torque, and the motor speed are passed 122 for use in a selection 124 of in phase and quadrature phase currents for the motor. The selected in-phase current is then modified 126 based on the torque demand undershoot, e.g. the amount by which the modified torque demand is less than the minimum torque demand.

The method of FIG. 3 is merely illustrative. Although the method of FIG. 3 comprises a number of stages examples of the disclosure need not include all of these stages, and some examples with fewer stages are defined in the appended claims. The selections 104, 112, 120 may be performed by any selector such as a look-up table, or by an analytic or numerical computer program. The minimum values referred to with reference to FIG. 3 may be defined by the working ranges of these selectors. Embodiments of the disclosure provide computer program products operable to program a processor to perform the method of FIG. 3.

Figure 4:
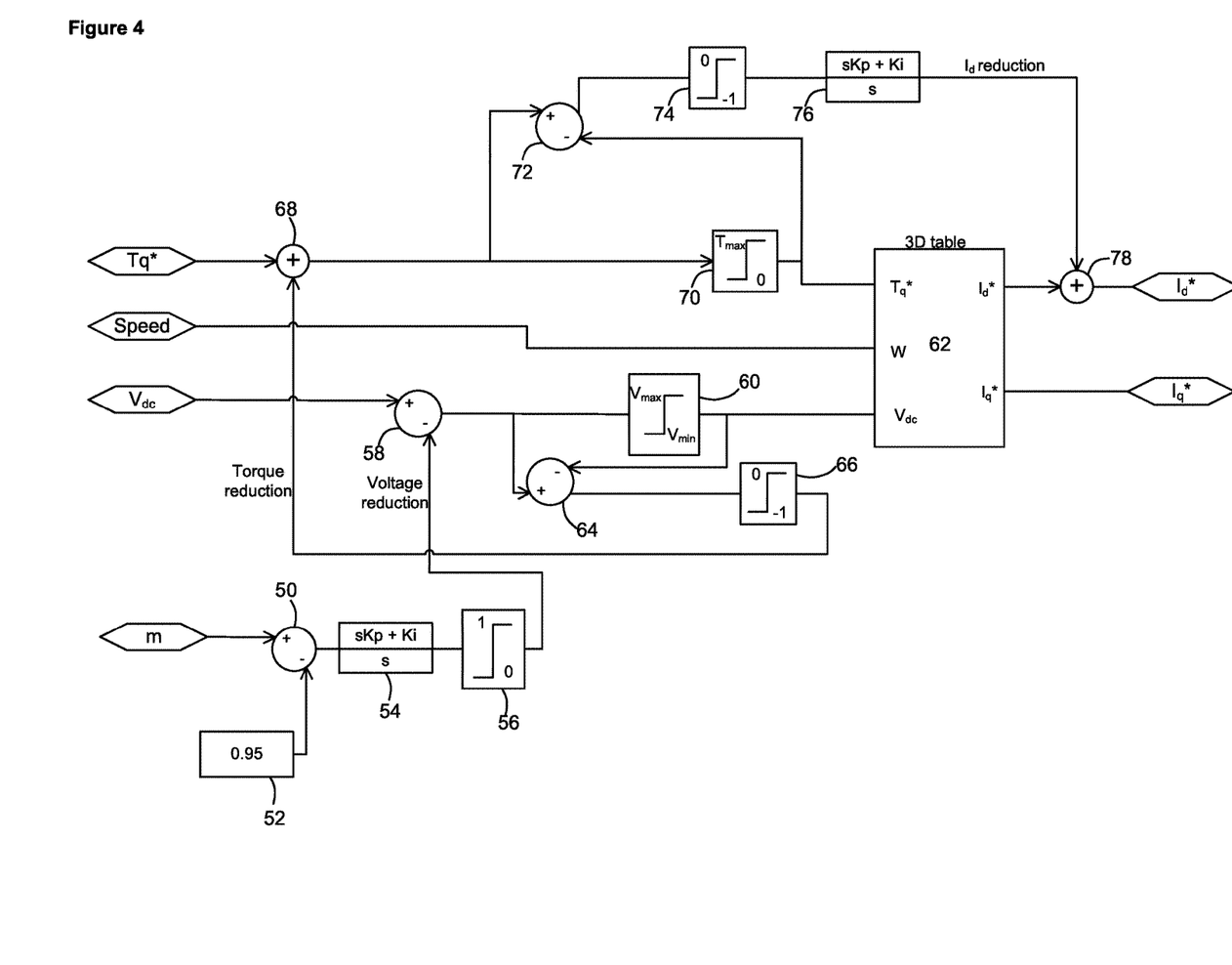
FIG. 4 shows a further example of the apparatus of FIG. 2.

FIG. 4 shows a further example of a DQ data provider for use in an apparatus such as that shown in FIG. 1, or for performing a method such as that described with reference to FIG. 3. In FIG. 4, for clarity all units are described in a per unit system.

In FIG. 4, a modulation index input is coupled to a subtractor 50 arranged to subtract a reference value from the modulation index to provide an error signal. The error signal output from the subtractor 50 is coupled to a proportional-integral, PI, controller 54 arranged to provide an output based on the error signal scaled by a selected gain, and the sum of the error signal over time. The output from the PI controller is coupled to a first saturation element 56. The saturation element 56 is configured to clip the output of the PI controller 54 to remain between zero (0) and one (1).

The output of the first saturation element 56 is coupled to a subtractor 58 which is arranged to subtract the clipped PI controller output from the DC voltage to provide a modified DC voltage value. The output of the subtractor 58, the modified DC voltage, is coupled to a second saturation element 60 which clips the modified DC voltage to within a selected range of voltages. The output of the saturation element 60 is coupled to an input of a 3D look up table 62. The output of the saturation element 60 is also coupled to a second subtractor 64 which is arranged to subtract the clipped modified voltage from the modified voltage. Thus, in the event that the modified DC voltage is within the selected voltage range defined by the second saturation element 60, the output of the subtractor 64 is zero. The output of the subtractor 64 is coupled to a third saturation element 66 configured to clip the output of the subtractor 64 so that it remains within a specified range, for example the range of zero (0) to minus 1 (−1).

The output of the third saturation element 66 is coupled to a summing element 68 arranged to add the (negative) output from the saturation element 66 from the torque demand to provide a modified torque demand. The modified torque demand is coupled to a fourth saturation element 70 arranged to clip the modified torque demand so that it is limited to a selected range of torque demands. The output of the saturation element is coupled to the torque demand input of the 3D look up table 62.

The output of the fourth saturation element 70 is also coupled to a subtractor 72 arranged to subtract the clipped modified torque demand from the modified torque demand value. Thus in the event that the modified torque demand is within the selected range defined by the saturation element 70, the output from the subtractor 72 is zero.

The output from the subtractor 72 is coupled to a fifth saturation element 74 arranged to limit the output from the subtractor to within a selected range. The output from the fifth saturation element 74 is coupled to a second PI controller 76 arranged to determine a current adjustment value based on the undershoot of the modified torque value (e.g. the difference between the modified torque value and the minimum torque value in the range of the look-up table 62. The current adjustment value from the second PI controller 76 is coupled to a summing element 78. The summing element 78 is also coupled to the in-phase current output of the 3D look up table 62. The 3D look-up table 62 is configured to provide current data $I_D$, $I_Q$ in response to received torque demand, speed, and DC voltage values.

In operation, in the event that the modulation index is less than the threshold level provided by the reference 52, the 3D look up table provides the stored $I_D$, and $I_Q$ values for the DC voltage, torque demand and motor speed. In the event that the modulation index is greater than that threshold, the field weakening scheme is applied by adjusting the DC voltage used to index into the look up table 62. This in turn reduces the modulation index.

If the modulation index continues to increase, once the range of DC voltage adjustment has been exhausted the torque demand is adjusted. Then, once the range of torque demand adjustment has been exhausted the in-phase current selected from the look up table 78 is reduced directly by applying a negative adjustment to the in-phase current data selected by the look-up table 62.

The apparatus and methods described with reference to FIGS. 1 to 4 are described as including a series of adjustments in which first voltage, then torque demand, then in phase current, $I_D$ are reduced. However in some examples, these stages may be applied in a different sequence, and/or only some of these stages are applied. For example the torque demand adjustment and/or the current adjustment stages may not be used. In some examples the adjustments may be applied in a different sequence, and in some cases the voltage adjustment need not be applied, e.g just the torque adjustment and/or current could be applied.

For example, it will be understood that the DC voltage used to select the current commands need not be varied, and the disclosure provides an apparatus for controlling an AC power supply for an electric motor, said AC power supply being derived from a DC voltage, the apparatus comprising: a comparer configured to provide a comparison of a modulation index of a motor control signal with a reference value; and a current data provider, configured to provide current data based on: a torque demand signal, modified based on the comparison; a speed signal indicating the speed of rotation of the AC motor; and an indication of the DC voltage; for control of the motor control signal based on the motor current data. In an embodiment this apparatus further comprises a current data modifier configured to modify the provided current data based on the difference between the modified torque demand signal and a boundary of a selected torque range in the event that the torque demand signal is outside the torque selected range.

Similarly, there is also provided an apparatus for controlling an AC power supply for an electric motor, said AC power supply being derived from a DC voltage, the apparatus comprising: a processor configured to: compare a modulation index of a motor control signal with a reference value; provide current data based on: a torque demand signal modified based on the comparison; a speed signal indicating the speed of rotation of the AC motor; and an indication of the DC voltage; to enable control of the motor control signal based on the motor current data. In addition, in one example there is provided a method of controlling a power supply for an AC motor, said AC power supply derived from a DC voltage, the method comprising: selecting data from stored motor current data based on: a selection signal based on a torque demand signal and a comparison between a reference value and a modulation index of a motor control signal; the speed of rotation of the AC motor; and the DC voltage; and controlling the motor control signal in accordance with the selected motor current data.

As another example, it will be understood that the DC voltage used to select the current commands need not be varied, and the torque demand also need not be varied, according the disclosure provides an apparatus for controlling an AC power supply for an electric motor, said AC power supply being derived from a DC voltage, the apparatus comprising: a comparer configured to provide a comparison of a modulation index of a motor control signal with a reference value; and a current data provider, configured to provide current data based on: a torque demand signal; a speed signal indicating the speed of rotation of the AC motor; and an indication of the DC voltage; for control of the motor control signal based on the motor current data, and a current data modifier configured to modify the provided current data based on the comparison.

Similarly, there is also provided an apparatus for controlling an AC power supply for an electric motor, said AC power supply being derived from a DC voltage, the apparatus comprising: a processor configured to: compare a modulation index of a motor control signal with a reference value; provide current data based on: a torque demand signal; a speed signal indicating the speed of rotation of the AC motor; and the modified indication of the DC voltage; for control of the motor control signal based on the motor current data, and to modify the provided current data based on the comparison. In addition, in another example there is provided a method of controlling a power supply for an AC motor, said AC power supply derived from a DC voltage, the method comprising: selecting current data from stored motor current data based on: a torque demand signal; the speed of rotation of the AC motor; and the DC voltage and a comparison between a reference value and a modulation index of a motor control signal; and modifying the selected current data based on a comparison between a reference value and a modulation index of a motor control signal, and controlling the motor control signal in accordance with the selected modified motor current data.

In an aspect there is provided an apparatus for controlling an AC power supply for an electric motor, said AC power supply being derived from a DC voltage, the apparatus comprising: a comparer configured to provide a comparison of a modulation index of a motor control signal with a reference value; and a current data provider, configured to provide current data based on: a torque demand signal; a speed signal indicating the speed of rotation of the AC motor; and an indication of the DC voltage, modified based on the comparison; for control of the motor control signal based on the motor current data.

In an aspect there is provided an apparatus for controlling an AC power supply for an electric motor, said AC power supply being derived from a DC voltage, the apparatus comprising: a processor configured to: compare a modulation index of a motor control signal with a reference value; modify an indication of the DC voltage based on the comparison; provide current data based on: a torque demand signal; a speed signal indicating the speed of rotation of the AC motor; and the modified indication of the DC voltage; for control of the motor control signal based on the motor current data.

In an aspect there is provided a method of controlling a power supply for an AC motor, said AC power supply derived from a DC voltage, the method comprising: selecting data from stored motor current data based on: a torque demand signal; a speed signal indicating the speed of rotation of the AC motor; and a selection signal based on the DC voltage and a comparison between a reference value and a modulation index of a motor control signal; and controlling the motor control signal in accordance with the selected motor current data.

Each of the foregoing examples and variations are intended to be combined with other features of the examples of the disclosure discussed elsewhere herein, and in particular to be combined with the features set out in each of the appended claims.

What is claimed is:

1. An apparatus for controlling an AC power supply for an electric motor, said AC power supply being derived from a DC voltage, the apparatus comprising:
   a comparer configured to provide a comparison of a modulation index of a motor control signal with a reference value; and
   a current data provider, configured to provide current data based on:
      a torque demand signal;
      a speed signal indicating the speed of rotation of the AC motor; and
      an indication of the DC voltage, modified based on the comparison;
   for control of the motor control signal based on the motor current data.

2. The apparatus of claim 1, comprising a torque demand modifier configured to modify the torque demand signal based on the modified indication of the DC voltage in the event that the modified indication of the DC voltage is outside a first selected range, and in which the current data provider is configured to provide motor current data based on the modified torque demand signal.

3. The apparatus of claim 2 comprising a current data modifier configured to modify the provided current data based on the difference between the modified torque demand signal and a boundary of a second selected range in the event that the torque demand signal is outside the second selected range.

4. The apparatus of claim 1 comprising a data store comprising a plurality of associations arranged to associate each of a plurality of current data elements with a respective:
   motor speed,
   torque demand, and
   DC voltage;
   wherein the data provider is configured to provide the current data by selecting amongst the stored data elements based on the associations.

5. The apparatus of claim 1 in which the modulation index of the control signal comprises the ratio of the motor control signal amplitude to one of: (a) a maximum amplitude value of a controller that provides the motor control signal; or (b) the amplitude of a timing signal used to determine a PWM signal from the motor control signal.

6. The apparatus of claim 1 further comprising a motor controller adapted to provide the motor control signal based on the current data.

7. The apparatus of claim 6 wherein the motor controller is configured to control an inverter adapted to derive said AC power supply from said DC power supply.

8. An apparatus for controlling an AC power supply for an electric motor, said AC power supply being derived from a DC voltage, the apparatus comprising:
   a processor configured to:
      compare a modulation index of a motor control signal with a reference value;
      modify an indication of the DC voltage based on the comparison;
      provide current data based on:
         a torque demand signal;
         a speed signal indicating the speed of rotation of the AC motor; and
         the modified indication of the DC voltage;
      for control of the motor control signal based on the motor current data.

9. The apparatus of claim 8, in which the processor is configured to modify the torque demand signal based on the modified indication of the DC voltage in the event that the modified indication of the DC voltage is outside a first selected range, and to provide motor current data based on the modified torque demand signal.

10. The apparatus of claim 9 in which the processor is configured to modify the provided current data based on the difference between the modified torque demand signal and a boundary of a second selected range in the event that the torque demand signal is outside the second selected range.

11. The apparatus of claim 10 in which the current data comprises a direct phase current information, and quadrature phase current information.

12. The apparatus of claim 11 in which the provided current data comprises an in phase current value, $I_D$, and a quadrature phase current value, $I_Q$, and in which modifying the current data comprises applying a negative adjustment to the in phase current value $I_D$.

13. The apparatus of claim 8 comprising a memory storing a plurality of associations between each of a plurality of current data elements with a respective:
   motor speed,
   torque demand, and
   DC voltage;
   wherein the processor is coupled to the memory and configured to provide the current data by selecting amongst the stored data elements based on the associations.

14. A method of controlling a power supply for an AC motor, said power supply derived from a DC voltage, the method comprising:
   selecting data from stored motor current data based on:
      a torque demand signal;
      a speed signal indicating the speed of rotation of the AC motor; and
      an indication of the DC voltage modified based on a comparison between a reference value and a modulation index of a motor control signal; and
   controlling the motor control signal in accordance with the selected motor current data.

15. The method of claim 14 comprising modifying the torque demand signal based on the selection signal in the event that the selection signal is outside a first selected range, and selecting the data based on the modified torque demand signal.

16. The method of claim 15 comprising modifying the selected data based on the difference between the torque demand and a boundary of a second selected range in the event that the modified torque demand signal is outside the second selected range.

17. The method of claim 16 in which the selected data comprises an in phase current value, $I_D$, and a quadrature phase current value, $I_Q$, and in which modifying the selected data comprises applying a negative adjustment to the in phase current value $I_D$.

18. The method of claim 14 in which the modulation index of the control signal comprises the ratio of the motor control signal amplitude to one of: (a) a maximum amplitude value of a controller that provides the motor control signal; or (b) the amplitude of a timing signal used to determine a PWM signal from the motor control signal.

19. An apparatus configured to perform the method of claim 14.

20. The apparatus of claim 19 further comprising a controller adapted to provide the motor control signal based on the current data.

21. The apparatus of claim 20 wherein the controller is configured to control an inverter adapted to derive said AC power supply from said DC power supply.

22. The apparatus of claim 21 further comprising the inverter.

23. The apparatus of claim 22 further comprising the motor.

24. The apparatus of claim 23 in which the motor is a permanent magnet motor.

* * * * *